United States Patent
Li et al.

(10) Patent No.: US 10,078,432 B2
(45) Date of Patent: Sep. 18, 2018

(54) DEVICES AND METHODS FOR USER INTERFACE PRESENTATION AND NAVIGATION

(71) Applicants: Hisense Co., Ltd., Qingdao, Shandong (CN); HISENSE USA CORP., Suwanee, GA (US)

(72) Inventors: Zhiqiang Li, Qingdao (CN); Tongqing Gao, Qingdao (CN); Tingfeng Guo, Qingdao (CN); Yichen Ding, Qingdao (CN); Hu Song, Qingdao (CN)

(73) Assignees: Hisense Co., Ltd., Qingdao (CN); Hisense USA Corp., Suwanee, GA (US)

( * ) Notice: Subject to any disclaimer, the term of this patent is extended or adjusted under 35 U.S.C. 154(b) by 1065 days.

(21) Appl. No.: 14/450,783

(22) Filed: Aug. 4, 2014

(65) Prior Publication Data
US 2015/0309700 A1    Oct. 29, 2015

(30) Foreign Application Priority Data
Apr. 24, 2014  (CN) .......................... 2014 1 0167968

(51) Int. Cl.
*G06F 3/0484* (2013.01)
*G06F 17/30* (2006.01)
(Continued)

(52) U.S. Cl.
CPC ........ *G06F 3/04842* (2013.01); *G06F 3/0482* (2013.01); *G06F 3/0485* (2013.01);
(Continued)

(58) Field of Classification Search
CPC ... G06F 3/00; G06F 3/14; G06F 3/048; G06F 3/0481; G06F 3/0482; G06F 3/0484;
(Continued)

(56) References Cited

U.S. PATENT DOCUMENTS 6,757,479 B1 * 6/2004 Niikawa ............ H04N 1/00458
386/224
8,271,898 B1 * 9/2012 Mattos .................. G06F 3/0485
345/473
(Continued)

FOREIGN PATENT DOCUMENTS

| CN | 1156511 A | 8/1997 |
|---|---|---|
| CN | 101146138 A | 3/2008 |

(Continued)

*Primary Examiner* — Xiomar L Bautista
(74) *Attorney, Agent, or Firm* — Gordon & Rees LLP

(57) ABSTRACT

The present disclosure relates to presenting a graphical user interface for navigating and browsing content. In one embodiment, a method includes detecting one or more interface commands for navigating the graphical user interface and one or more content titles associated with an index table, analyzing the one or more interface commands for navigating the graphical user interface and the one or more content titles associated with the index table, and updating presentation of the graphical user interface based on the analyzing, wherein the graphical user interface is updated to display graphical elements based on a subset of the content titles associated with the index table and wherein navigation of the graphical user interface is modified to provide increased navigational speed for the graphical user interface. The method may also include receiving a selection for an index table and updating the graphical user interface based on the selection.

21 Claims, 6 Drawing Sheets

(51) Int. Cl.
*H04N 21/431* (2011.01)
*H04N 21/458* (2011.01)
*G06F 3/0482* (2013.01)
*G06F 3/0485* (2013.01)
*H04N 21/482* (2011.01)
*H04N 21/442* (2011.01)
*H04N 21/4722* (2011.01)

(52) U.S. Cl.
CPC .. *G06F 17/30038* (2013.01); *G06F 17/30321* (2013.01); *H04N 21/4312* (2013.01); *H04N 21/44222* (2013.01); *H04N 21/4586* (2013.01); *H04N 21/4722* (2013.01); *H04N 21/482* (2013.01); *H04N 21/4821* (2013.01)

(58) Field of Classification Search
CPC ...... G06F 3/04842; G06F 8/38; G06F 9/4443; G06F 17/30; H04N 5/44543; H04N 7/00; H04N 7/173; H04N 7/17318; H04N 21/431; H04N 21/4622; H04N 21/4722; H04N 21/482
See application file for complete search history.

(56) References Cited

U.S. PATENT DOCUMENTS

| | | | | |
|---|---|---|---|---|
| 8,745,499 B2 * | 6/2014 | Pendergast | ............ | G06F 3/0482 715/713 |
| 2003/0090504 A1 * | 5/2003 | Brook | ............... | G06F 17/30843 715/716 |
| 2006/0090141 A1 * | 4/2006 | Loui | ................. | G06F 17/30064 715/764 |
| 2006/0253547 A1 * | 11/2006 | Wood | ................ | G06F 17/30017 709/217 |
| 2006/0262116 A1 * | 11/2006 | Moshiri | ................ | G06F 3/0346 345/419 |
| 2006/0271870 A1 * | 11/2006 | Anwar | .................. | G06F 3/0481 715/764 |
| 2006/0282858 A1 * | 12/2006 | Csicsatka | .............. | G06F 3/0485 725/52 |
| 2007/0085841 A1 * | 4/2007 | Tsuk | .................... | G06F 3/03547 345/173 |
| 2008/0201315 A1 * | 8/2008 | Lazier | ................. | G06F 3/04812 |
| 2008/0263095 A1 * | 10/2008 | Porter, III | ........... | G06F 3/04842 |
| 2009/0002335 A1 * | 1/2009 | Chaudhri | ............ | G06F 3/04815 345/173 |
| 2009/0066651 A1 * | 3/2009 | Griffin | ................ | G06F 3/03549 345/167 |
| 2009/0219304 A1 * | 9/2009 | Martin | .................. | G06F 3/0485 345/684 |
| 2011/0179451 A1 * | 7/2011 | Miles | ..................... | H04N 5/445 725/42 |
| 2011/0246941 A1 * | 10/2011 | Gonzalez | .............. | G06F 3/0237 715/816 |
| 2012/0173977 A1 * | 7/2012 | Walker | .................. | G06F 3/0485 715/716 |
| 2012/0297429 A1 * | 11/2012 | Reed | ................. | G06F 17/30899 725/86 |
| 2012/0319959 A1 * | 12/2012 | Saponas | ................ | G06F 3/0237 345/173 |
| 2014/0280048 A1 * | 9/2014 | Bumgarner | ........... | G06F 3/0482 707/722 |
| 2015/0074721 A1 * | 3/2015 | Fishman | ............ | H04N 21/4821 725/45 |
| 2015/0177953 A1 * | 6/2015 | Khalsa | ............ | G06F 17/30852 715/716 |

FOREIGN PATENT DOCUMENTS

| | | |
|---|---|---|
| CN | 101252401 A | 8/2008 |
| CN | 101321342 A | 12/2008 |
| CN | 102065251 A | 5/2011 |
| CN | 102117163 A | 7/2011 |
| CN | 102486710 A | 6/2012 |
| CN | 102821202 A | 12/2012 |
| CN | 103197770 A | 7/2013 |

\* cited by examiner

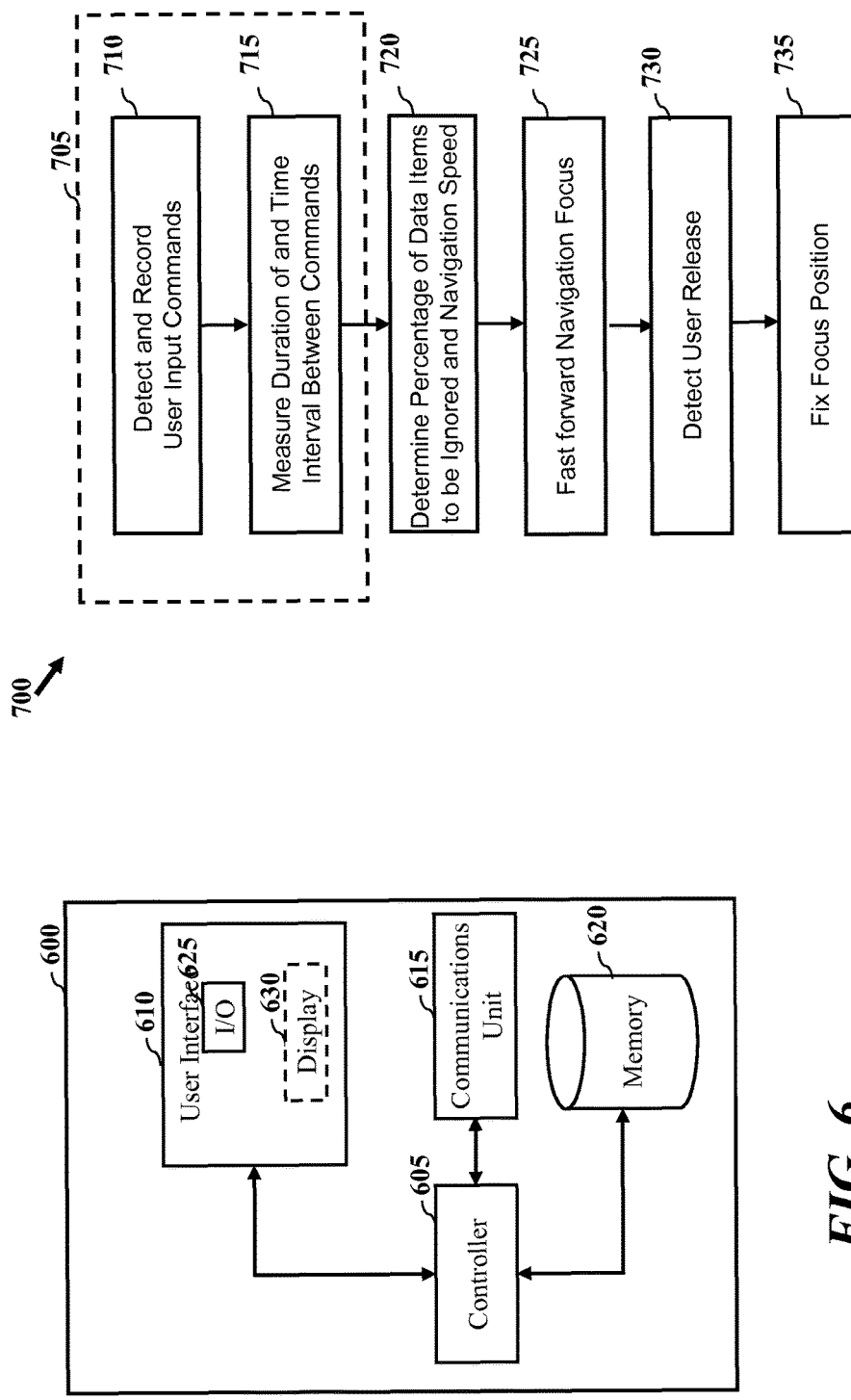

DEVICES AND METHODS FOR USER INTERFACE PRESENTATION AND NAVIGATION

PRIORITY

This application claims priority to Application No. 201410167968.3 entitled Data Types Used In The Positioning Method and Apparatus for Smart TV filed in China on Apr. 25, 2014, the content of which is incorporated by reference.

FIELD

The present disclosure relates generally to devices, systems and methods for presenting a user interface, and more particularly to navigating and browsing content.

BACKGROUND

Program guides in conventional user interfaces typically involve a scrolling list or multiple page listings to display programs that may be viewed or downloaded. Often, these program guides include long lists of programs, and particular programs are often difficult to locate or browse based on the presentation of programs and the navigation controls of conventional user interfaces. Browsing of program guides can be an important aspect of a user's experience.

Navigation of content in conventional systems may be limited due to limited controls and the amount of data that must be processed. Some user interfaces are slow due to extended loading times and are cumbersome to use. Thus, conventional systems suffer from slow and poor user control features.

There is a need in the art for systems and methods that allow for improved navigation and browsing of content in a user interface.

BRIEF SUMMARY OF THE EMBODIMENTS

Disclosed and claimed herein are devices, systems and methods for presenting a graphical user interface for navigating content. In one embodiment, a method for presenting a graphical user interface includes, detecting, by a device, one or more interface commands for navigating the graphical user interface and one or more content titles associated with the an index table, analyzing, by the device, the one or more interface commands for navigating the graphical user interface and the one or more content titles associated with the index table, and updating, by the device, presentation of the graphical user interface based on the analyzing, wherein the graphical user interface is updated to display graphical elements based on a subset of the content titles associated with the index table and wherein navigation of the graphical user interface is modified to provide increased navigational speed for the graphical user interface.

In another embodiment, a method includes, receiving, by a device, a selection of an element of the graphical user interface, wherein the selection is associated with an index table and wherein the index table is associated with one or more content titles, updating presentation of a graphical user interface, by the device, based on the selection, wherein the graphical user interface is updated to display graphical elements for a plurality of content titles associated with the index table, detecting, by the device, one or more interface commands for navigating the graphical user interface and the content titles associated with the index table, and analyzing, by the device, the one or more interface commands for navigating the graphical user interface and the content titles associated with the index table. The method also includes controlling, by the device, presentation of the graphical user interface based on the analyzing, wherein the graphical user interface is updated to display graphical elements based on a subset of the content titles associated with the index table and wherein navigation of the graphical user interface is modified to provide increased navigational speed for the graphical user interface.

In one embodiment, each index table identifies content based on one or more parameters and wherein each index table identifies a subset of content accessible from a content server.

In one embodiment, the content titles are one or more or types of content associated with video data, applications and media content.

In one embodiment, the graphical user interface is a graphical display to provide graphical elements for selection of content and for at least one of display and output by the device.

In one embodiment, the graphical user interface commands include at least one of directional, selection, advancement, and scrolling commands.

In one embodiment, the analyzing includes identifying duration and quantity of commands received by the device during an interval of time.

In one embodiment, the analyzing includes detecting activation and release of a command input.

In one embodiment, the updating includes narrowing content associated with the index table to be presented by the graphical user interface.

In one embodiment, the controlling includes changing the presentation of content by the graphical user interface including at least one of enlarging presentation of content and increasing focus for content titles.

In one embodiment, content presentation is advanced at one or more increasing rates based on the analyzing of one or more interface commands.

Another embodiment is directed to a device configured to present a graphical user interface for navigating and browsing content. The device includes a communications unit configured to receive a selection of an element of the graphical user interface, wherein the selection is associated with an index table and wherein the index table is associated with one or more content titles. The device also includes a controller coupled to the communications unit, wherein the controller is configured to update presentation of a graphical user interface based on the selection, wherein the graphical user interface is updated to display graphical elements for a plurality of content titles associated with the index table, detect one or more interface commands for navigating the graphical user interface and the content titles associated with the index table, analyze the one or more interface commands for navigating the graphical user interface and the content titles associated with the index table, and control presentation of the graphical user interface based on the analyzing, wherein the graphical user interface is updated to display graphical elements based on a subset of the content titles associated with the index table and navigation of the graphical user interface is modified to provide increased navigational speed for the graphical user interface.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 6 depicts a simplified diagram of a device according to one or more embodiments;

FIG. 7 depicts a process according to one or more embodiments; and

DETAILED DESCRIPTION OF THE EXEMPLARY EMBODIMENTS

Overview and Terminology

Figure 1A:
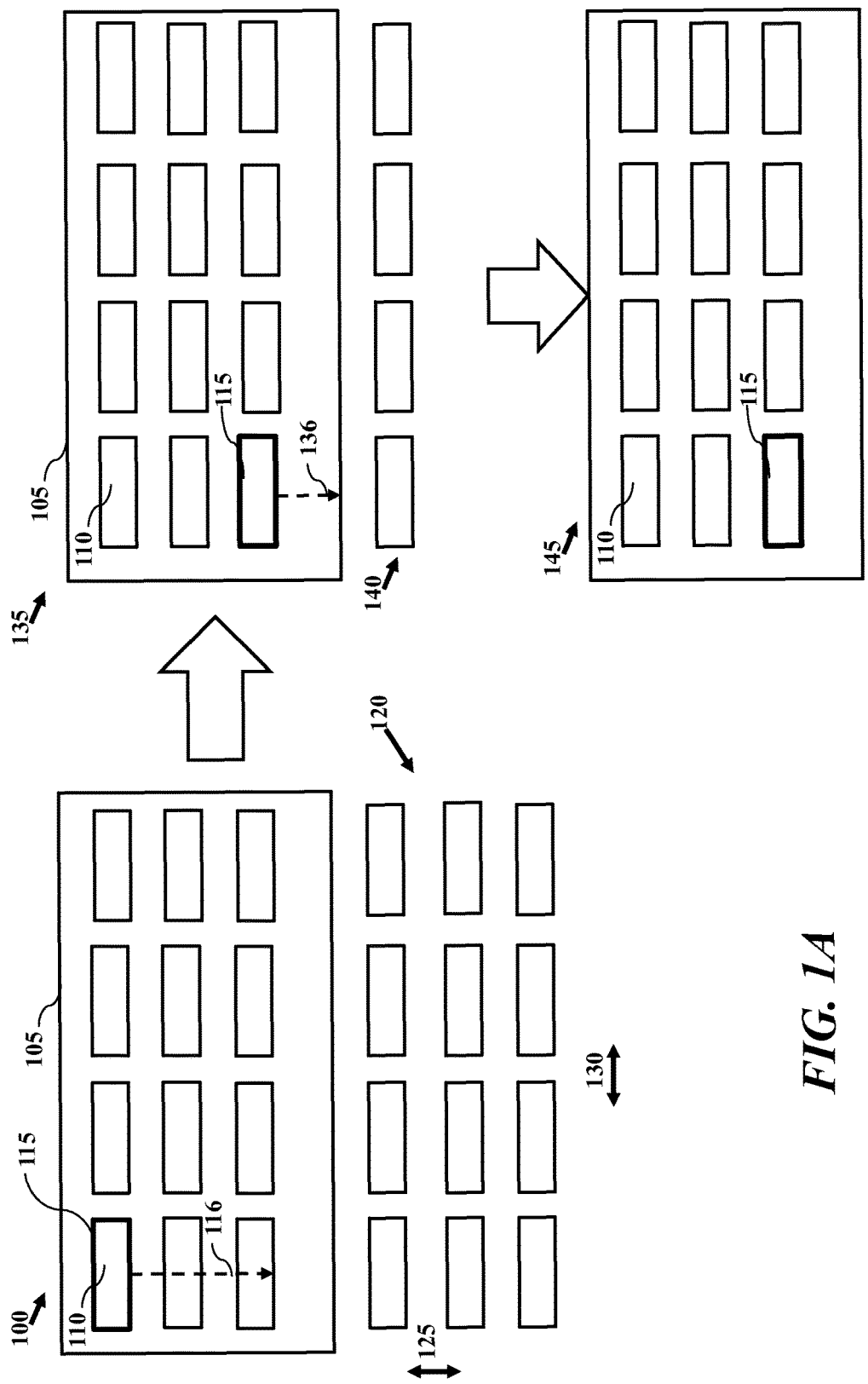
FIG. 1A depicts a graphical representation of graphical user interface presentation according to one or more embodiments.

One aspect of the disclosure is to present a graphical user interface with improved positioning speed and interaction experience. Graphical user interface presentation as discussed herein is provided for display devices, such as smart TVs, set-top boxes, media players, mobile devices and electronic devices in general. The graphical user interface may be presented for navigating and browsing content. Navigating refers to locating content and/or positioning a focus element to advance the graphical user interface to content. Browsing refers to viewing and/or presentation of graphical elements for content that can be accessed by the graphical user interface.

Content may relate to one or more of video data, such as movies, broadcast programming (e.g., TV shows, etc.), streamed media, and video data in general. In some embodiments, content includes media content such as audio data, applications ("apps"), etc. Content elements, which also may be referred to as content titles, are one or more individual units of content, such as a particular movie, TV show, broadcast element, application or media type that may be navigated to and/or presented in a graphical user interface. Content titles may identify content associated with video data, applications and media content. Content titles may be presented as graphical elements (e.g., image data, text, etc.) by the graphical user interface. In certain embodiments, presentation of content in the user interface may only require limited information, such as an identifying image and title. In that fashion, the amount of information that is required to present the user interface may be reduced. In addition, content titles may be associated with index tables.

According to one embodiment, presentation of a graphical user interface may be based on preprocessing and/or analysis of content to establish one or more index tables that may be used to present a graphical user interface. By creating index tables for content, a graphical user interface may be presented quickly and efficiently without requiring downloading or processing of all content that is available for display. By way of example, the graphical user interface may be presented with a portion of the content that is available for viewing. In that fashion, content that is not of interest to a user may be avoided by selection of a graphical element associated with an index table.

According to another embodiment, presentation of a graphical user interface may be based on analysis of received user commands (e.g., user behavior) during presentation of the graphical user interface. By way of example, in addition to direction/directional commands, advancement commands and scrolling, a graphical user interface may be configured to adjust the positioning speed of a focus element to one or more advanced or accelerated speeds. In addition, the amount of content relative to the focus element may be narrowed to improve efficiency of the graphical user interface and allow improved navigation of a graphical user interface. By way of example, the graphical user interface may narrow the amount of content or content elements displayed in a display window of the graphical user interface and/or content elements that may be navigated to. In that fashion, content may be narrowed, reduced, or limited to a subset (e.g., reduced number of elements) of the content elements available for display and/or navigation. Moreover, narrowing can provide better efficiency by reducing the amount of data, and in particular, number of content elements to process.

Graphical user interfaces may be presented by a display device or output for display by a device. The graphical user interface is a graphical display to provide graphical elements for selection of content and for at least one of display and output by the device. In one embodiment, the graphical user interface includes one focus element, which may be employed to select a graphical element and to navigate the presentation of content on the graphical user interface. In some embodiments, multiple focus elements may be employed. A graphical user interface may be configured for presentation on touch-screen devices and non-touch screen devices. Graphical user interfaces may be configured to allow for browsing and navigating content that is being broadcast or pre-recorded.

According to one embodiment, index tables provide a list or identification of content titles based on a particular category. Index tables may include one or more fields to identify content based on one or more parameters of the content. Each index table can identify a subset of content accessible from a content server or content source. For example, index tables can identify a subset of the movie catalog that may be provided or downloaded from a video server. According to another embodiment, index tables may be pre-processed, or determined prior to presentation of the graphical user interface.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1B:
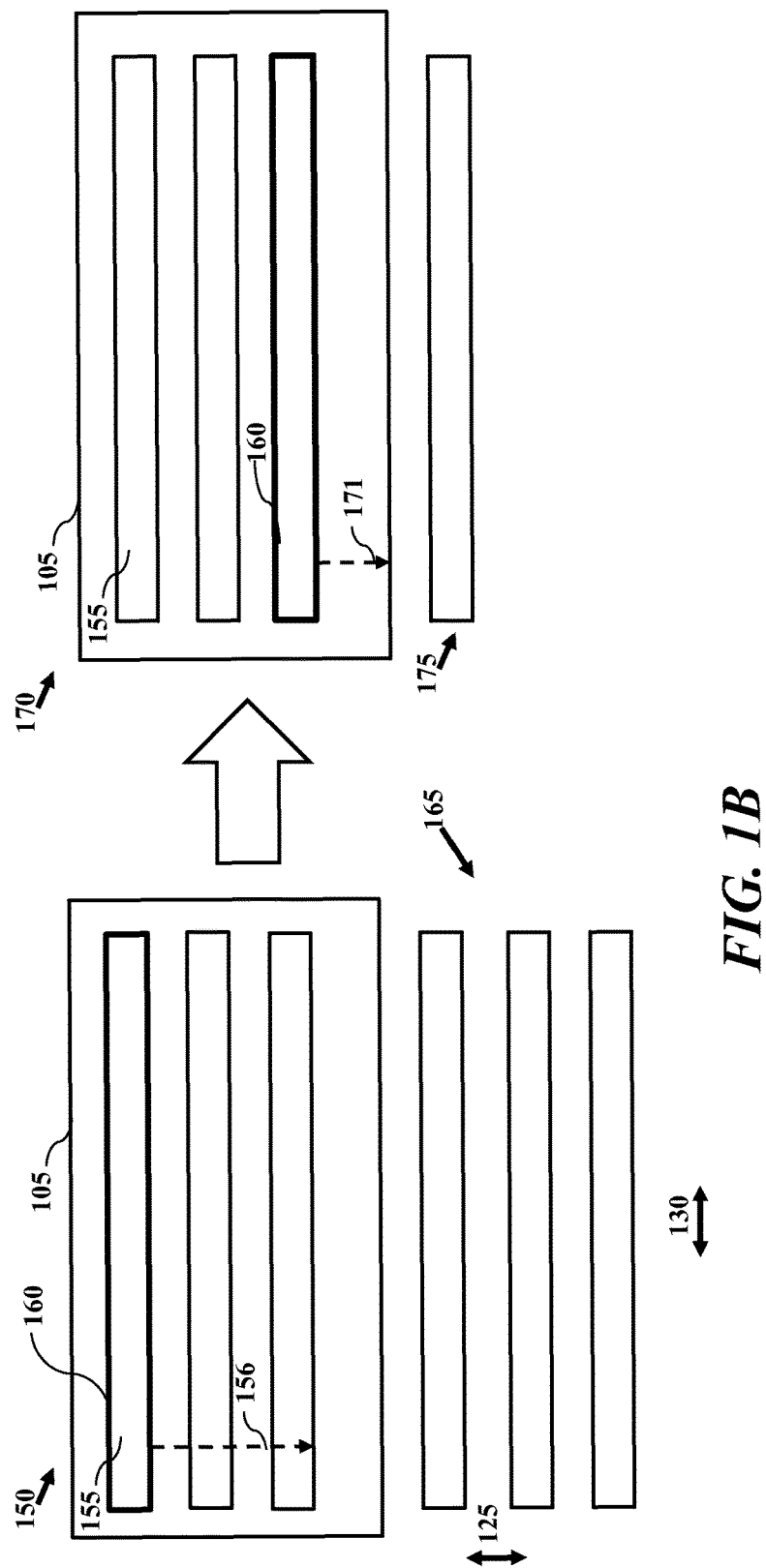
FIG. 1B depicts a graphical representation of graphical user interface presentation according to one or more other embodiments.

Referring now to the figures, FIGS. 1A-1B depict graphical representations of graphical user interfaces according to one or more embodiments. In one embodiment, graphical user interface 100 may be presented for one or more of navigating and browsing content, such as content of a program guide. Graphical user interface 100 provides one or more features to efficiently present content titles and present content for display. Graphical user interface 100 may be presented based on pre-processed data to create index tables and algorithms to determine the user operation. In that fashion, content that a user is not interested in may be ignored (e.g., not loaded or presented); such that the graphical user interface does not require presentation or processing of content that is not of interest.

In one embodiment, graphical user interface 100 may be output to display window 105 of a device. Graphical user interface 100 relates to a configuration for presenting content including, graphical elements, shown as 110, to represent content that can be accessed, viewed, navigated to and/or browsed. By way of example, display window 105 may be a display device presenting content, such as movie titles, wherein each graphical element 110, represents a particular movie title. Graphical user interface 100 can also provide a focus element 115 to allow for navigation of the graphical user interface and selection of content.

According to one embodiment, graphical user interface 100 includes graphical elements shown as 110 in display window 105 and allows for display of additional graphical elements, shown as 120, that may be accessible to the device. Graphical user interface 100 is configured to allow a user to navigate to graphical elements 120, such that the elements presented in display window 105 may be modified.

Graphical user interface 100 can present content to provide a user with a format for browsing, navigating, and selecting content. Content displayed by graphical user interface 100 may be based on content available for display provided by a device and/or content that may be accessible from a network connection. Graphical user interface 100 provides one representation of a graphical user interface according to the disclosure, however, according to one or more embodiments, presentation of a graphical user interface may be modified to allow for browsing and selection of content.

In one embodiment, graphical user interface 100 includes graphical elements 110 based on a selection of an index table. For example, content 110 may be displayed when the device detects a user selection for an index table. A device may be configured to receive a selection for an index table associated with one or more content titles and update presentation of a graphical user interface, to display graphical elements 110 for a plurality of content titles associated with the index table in graphical user interface 100. In other embodiments, available index tables may be presented and associated with each graphical element 110.

In FIG. 1A, graphical elements 110 are depicted as tiles in a grid formation. It should be appreciated that the embodiments described herein may present graphical elements 110 in different formations or presentations. In addition, although a plurality of graphical elements 110 are shown in FIG. 1A across the entire display window 105, it should also be appreciated that a portion of display window 105 may be employed in certain embodiments. Similarly, graphical user interface 100 as described and as shown in FIG. 1A, may include additional display elements (not shown) in display window 105.

Focus element 115 may be moved to highlight or select content, in one or more directions, including vertically, shown by 125 and horizontally, shown by 130. Based on a user command, such as a down command 116, focus element 115 may be applied to one or more other graphical elements and the presentation and graphical elements of graphical user interface 100 may be modified. In that fashion, a user may browse and navigate to content within display window 105 and to content outside of the display window 105.

FIG. 1A additionally depicts updating of the graphical user interface 100 according to one or more embodiments. Based on interface commands detected by a device for navigating the graphical user interface 100 and the content titles associated with the index table, graphical user interface 100 may be modified. By way of example, certain interface commands may indicate a desire of the user to view a reduced set, or narrowed set, of content based on the interface command. As an example, a user selection of a directional key on a remote control, or navigation button on a graphical user interface, may update the presentation of graphical user interface 100 to present graphical user interface 135. Graphical user interface 135 includes a reduced set of content titles in comparison to graphical user interface 100.

Presentation of graphical user interface 135 may be modified based on analyzing the one or more interface commands for navigating the graphical user interface and the content titles associated with the index table. By way of example, a direction command 116 held for a particular period of time may reduce the content for display with index table by a predefined amount or percentage. As will be discussed in more detail below, direction command 116 may also change the appearance and rate that content is presented by the graphical user interface 100. Graphical user interface 135 may be presented to allow a user to navigate to graphical elements 140 not in display window 105. Graphical elements 140 are associated with additional content which is not currently displayed in display window 105. Similar to the user directional command 116, a user directional command 136 may further update the display of the user interface. User directional commands, such as user directional command 116 and user directional command 136, can limit, reduce or narrow presentation of content. Repeated activation (or duration) of a user directional command, such user directional command 136 can further narrow the presentation of content, such that number of content titles that may be accessed in a particular presentation of the graphical user interface or the number of content titles available for browsing may be limited to a subset of the total amount of content available. In one exemplary embodiment, direction command 136 relates to activation of the same direction button or command associated with direction command 116. In response to continued activation of the directional command 136, the graphical user interface 135 may display graphical user interface 145 which includes a narrowed set of content relative to graphical user interface 135. Although the discussion of updating a graphical user interface is discussed with respect to direction commands in FIG. 1A, it should be appreciated that other types of instruction or commands may be employed to update presentation of a display.

Updating the presentation of the graphical user interface in FIGS. 1A-1B allows for a limited screen size, or portion of the screen, to navigate to content. In addition to the updated graphical user interface, a system as described herein may also process data associated with graphical element 110 and index tables to allow for efficient and fast presentation of content. In that fashion large amounts of content may be navigated to and/or navigation of large amounts of content may be simplified by reducing the number of items that will be displayed based on selection of an index table. As will be further discussed below, content associated with an index table may be preprocessed to allow for certain content titles to be ignored during navigation.

FIG. 1B depicts a graphical representation of user interface presentation according to one or more other embodiments. Graphical user interface 150 relates to another configuration for presenting a graphical user interface on display window 105 similar to the graphical user interface of FIG. 1A. In FIG. 1B, graphical user interface 150 provides a listing of content including, graphical elements shown as 155, to represent content, or alternatively an index table. Graphical user interface 150 can also provide a focus element 160 to allow for navigation of the graphical user interface 150 and selection of content. Graphical user interface 150 includes graphical elements shown as 155 in display window 105 and allows for display of additional graphical elements, shown as 165, that may be accessible to the device by navigation within the graphical user interface 150.

Graphical user interface 150 may be modified based on a direction command, shown as 156. In certain embodiments, a user activating a direction command for a predetermined period of time can prompt the graphical user interface 150 to narrow the number or amount of content available with an index table. A device detecting activation of a direction command, such as a down command 156 can update the graphical user interface display from graphical user interface 150 to graphical user interface 170. Graphical user interface 170 includes a reduced set of graphical elements, such as a reduced set of content titles or index tables. Graphical user interface 170 also depicts focus element 160 moved to a different position based on down command 156. Graphical user interface 170 includes graphical elements shown as 155 in display window 105 and allows for display of additional graphical elements, shown as 175, that may be accessible to the device by navigation within the graphical user interface, such as direction command 171. By using direction commands to reduce the number of content titles, a graphical user interface as described herein allows for directional commands to have additional operability within a display device.

Figure 2:
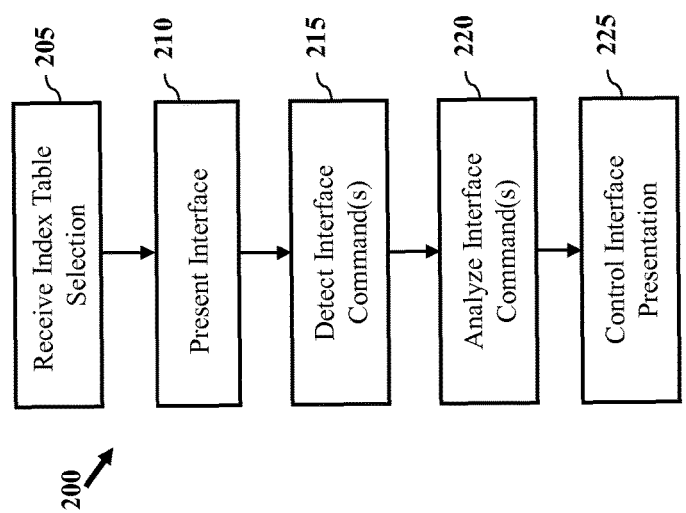
FIG. 2 depicts a process for presenting a graphical user interface according to one or more embodiments.

FIG. 2 depicts a process for presenting a graphical user interface according to one or more embodiments. Process 200 may be employed for presenting a graphical user interface for navigating and browsing content. Process 200 may be performed by one or more devices, such as the devices of FIG. 4 and FIG. 6.

Process 200 may be initiated at block 205 with receiving a selection for an index table. In certain embodiments, a graphical user interface, such as the graphical user interfaces of FIG. 1A-1B, may display one or more graphical elements associated with an index table that may be selected. Each index table may be associated with a category, content type, and/or indexing feature in general. In that fashion, each index table identifies content based on one or more parameters and each index table identifies a subset of content accessible from a content server. Each index table is associated with one or more content titles, such as video data, applications and media content. For example, when content relates to movies, index tables may be defined for genres, actor's names, and related movies (e.g., sequels, series, etc.). Similar types of indexes may be created for other types of video content, such as TV programs. Other types of content, such as apps, may be indexed based on keyword, type, cost, etc.

At block 210, the presentation of a graphical user interface may be updated based on the selection. In addition, the graphical user interface is updated to display graphical elements for a plurality of content titles associated with the index table.

In certain embodiments, receiving a selection for an index table at block 205 and updating the presentation of a graphical user interface based on the selection at block 210 may be optional for process 200.

At block 215, one or more interface commands are detected for navigating the graphical user interface and the content titles associated with the index table. User interface commands can include at least one of directional, selection, advancement, and scrolling commands.

At block 220, the one or more interface commands may be analyzed for navigating the graphical user interface and the content titles associated with the index table. In one embodiment, analyzing includes identifying duration and quantity of commands received by the device during an interval of time. Analyzing can include detecting activation and release of a command input. In one embodiment, exemplary interface commands are discussed below with reference to Table 1. Analyzing at block 220 may be based on durations of a command and include determination of a percentage of narrowing or selection of content for presentation of a graphical user interface.

At block 225, presentation of the graphical user interface may be controlled and/or updated based on the analyzing at block 220. The graphical user interface is updated to display graphical elements based on a subset of the content titles associated with the index table and navigation of the graphical user interface is modified to provide increased navigational speed for the graphical user interface. In one embodiment, updating includes narrowing content associated with the index table to be presented by the graphical user interface. Updating can include changing the presentation of content by the graphical user interface for at least one of enlarging presentation of content and increasing focus for content. Alternatively, or in combination, content presentation is advanced at one or more increasing rates based on the analyzing of one or more graphical user interface commands.

Figure 3A:
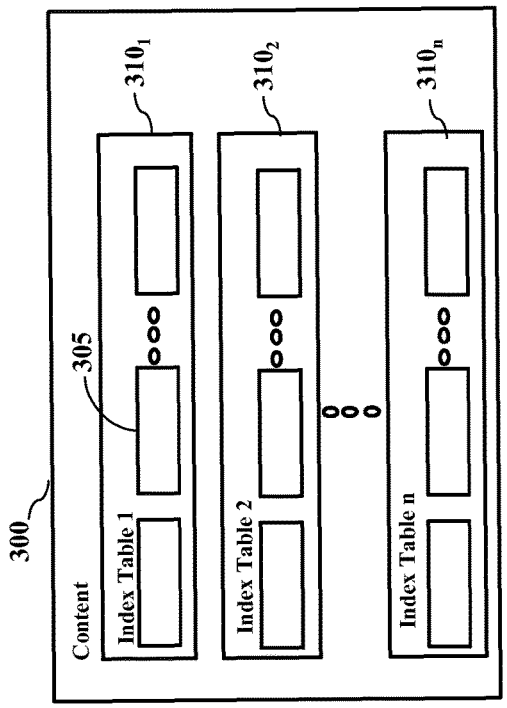
FIG. 3A depicts a graphical representation of index tables according to one or more embodiments.

FIG. 3A depicts a graphical representation of index tables according to one or more embodiments. According to one embodiment, a graphical user interface 300 is provided for navigating and browsing content. Index tables as used herein may be employed to target particular content of interest to a user. According to one embodiment, index tables are a data record, wherein each data record may identify and/or be associated with one or more content titles. The index tables may be accessed by the graphical user interface 300 to present graphical elements, such as content titles and graphical elements, for selection or viewing by a user. In that fashion, presenting content titles based on an index table does not require presentation of the titles in a list or table. Rather, presentation of graphical user interface 300 (e.g., graphical interface 100, graphical interface 150) based on an index table can allow for presentation of a particular set of content titles as graphical elements based on a selection of the graphical user interface 300 associated with the index table. In certain embodiments, index tables may be employed to identify content for a portion of a display window. According to another embodiment, multiple index tables may be selected for presentation of content titles within a graphical user interface.

According to another embodiment, content available for presentation or display may be pre-processed such that content, such as a particular content title, shown as 305, is associated or linked with one or more index tables $310_{1-n}$. Index tables $310_{1-n}$ may also allow for more efficient processing of content for display by a graphical user interface. By way of example, the amount of data to be processed and/or memory for populating the graphical user interface 300 may be reduced when an index table is selected in comparison to processing data for all content that can be presented by the graphical user interface 300. Selection of a graphical element associated with an index table, can result in the graphical user interface 300 presenting content titles based on the selection, and processing and memory allocation can then be based on the content titles associated with the selected index table.

Figure 3B:
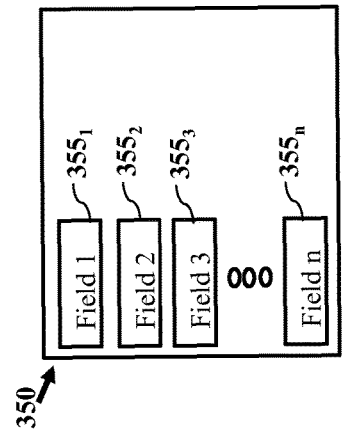
FIG. 3B depicts a graphical representation of index table parameters according to one or more embodiments.

FIG. 3B depicts a graphical representation of index table parameters according to one or more embodiments. According to one embodiment, each index table, shown as 350, includes a plurality of parameters or fields $355_{1-n}$ for associating content to the index table. By way of example, when content relates to a movie, fields $355_{1-n}$ may be provided for one or more of movie title, the first word of a movie title, type, year released, description, movie rating, movie rating, genre, actor(s) name(s), etc.

Figure 4:
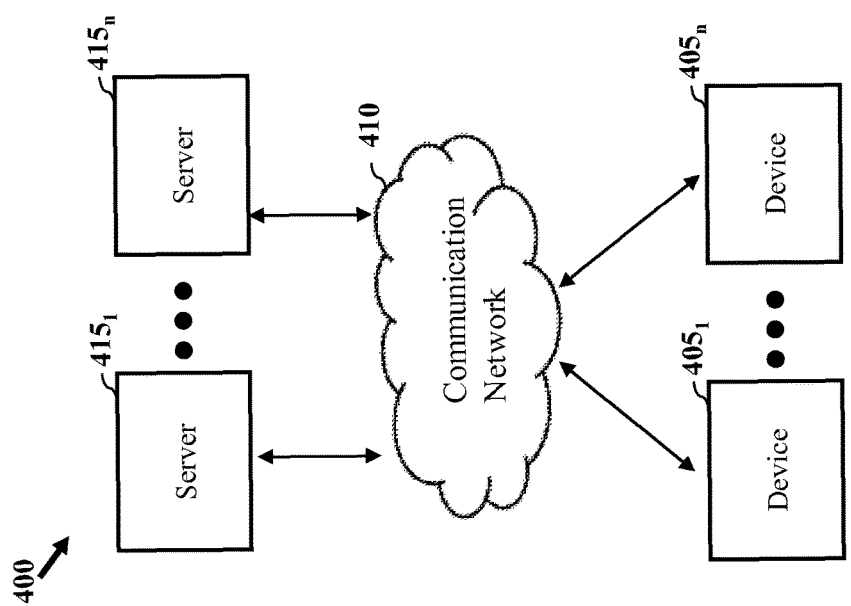
FIG. 4 depicts a simplified system diagram according to one or more embodiments.

FIG. 4 depicts a simplified system diagram according to one or more embodiments. According to one embodiment, system 400 may be configured to provide content based on index tables and one or more user interface commands. System 400 includes devices $405_{1-n}$, communication network 410 and servers $415_{1-n}$. Devices $405_{1-n}$ may be configured to communicate with one or more servers, such as $415_{1-n}$, via communication network 410, which may be a wired and/or wireless network. In one embodiment, servers $415_{1-n}$ may be configured to store and/or transmit content to devices $405_{1-n}$. Servers $415_{1-n}$ may be content servers and/or network storage servers. Devices $405_{1-n}$ may be end user devices configured for network communication including but not limited to TVs, set-top boxes, media players, mobile devices, etc. Devices $405_{1-n}$ may be configured to present a graphical user interface and update presentation of the graphical user interface to display graphical elements based on one or more index tables and allow for navigation of the graphical user interface to provide increased navigational speed for the graphical user interface. System 400 may be configured to employ the process of FIG. 2 for presentation of content and a graphical user interface.

Figure 5:
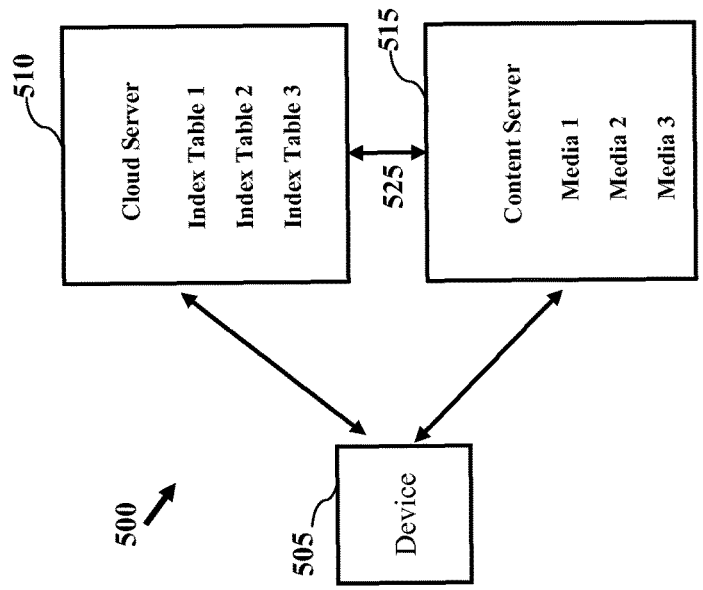
FIG. 5 depicts a simplified system diagram according to one or more embodiments.

FIG. 5 depicts a simplified system diagram according to one or more embodiments. System 500 includes device 505, cloud server 510 and content server 515. Content server 515 may be one or more servers configured to store content, such as media files. Cloud server 510 may be one or more a servers configured to generate index tables based on content stored by content server 515. Cloud server 510 may communicate with content sever 515 by way of network communications 525 to provide index tables for cloud server 510.

In certain embodiments, content server 515 may deploy or generate a cloud based index server, such as cloud server 510. Content server 515 may be configured for primary storage of video content, such as movie metadata (movie name, type, year, actors, description, rating, number of views, poster images, etc.), the movie data to create an index on a regular basis through the indexing engine. Index data may be stored by cloud server 510.

According to one embodiment, device 505 may be configured to present a graphical user interface based on index tables provided by cloud server 510. In that fashion, device 505 does not have to download the content of content server 515 to generate a graphical user interface. Device 505 may then download selected content from content server 515 when a user selection is detected for content.

FIG. 6 depicts a simplified diagram of a device according to one or more embodiments. Device 600 may relate to one or more devices for presenting content. In one embodiment, device 600 relates to a display device, such as a TV, mobile device, or device having a display in general. According to another embodiment, device 600 may be a device, such as a set-top box, configured to output content to a display device. As shown in FIG. 6, device 600 includes controller 605, graphical user interface 610, communications unit 615 and memory 620.

Controller 605 may be configured to execute code stored in memory 620 for operation of device 600 including presentation of a graphical user interface. Controller 605 may include a processor and/or one or more processing elements. In one embodiment controller 605 may be include one or more of hardware, software, firmware and/or processing components in general. According to one embodiment, controller 605 may be configured to perform one or more processes described herein, such as the process of FIG. 2. Graphical user interface 610 may be configured to receive one or more commands via an input/output (I/O) interface 625 which may include one or more inputs or terminals to receive user commands. When device 600 relates to a TV, I/O interface 625 may receive one or more remote control commands.

Communications unit 615 may be configured for wired and/or wireless communication with one or more network elements, such as servers $415_{1-n}$ of FIG. 4. Memory 620 may include non-transitory RAM and/or ROM memory for storing executable instructions, operating instructions and content for display.

FIG. 7 depicts a process for modifying the display of content based on user input commands according to one or more embodiments. According to one embodiment, user commands for navigating content, such as directional commands, can be employed to modify the amount of content and the navigation of content. Process 700 allows for adjusting the focus and content of the graphical user interface to be modified based on detected user commands and/or user activity. Process 700 may be based on one or more index tables generated by a video data server or cloud server. The graphical user interface may present graphical elements for users to browse and optionally to download information in accordance with a selected index table. Based on a user selection of an index table, the index table is downloaded to a device (e.g., a display device), and presented to an end user. Presentation of the index table includes content with an image and title (e.g., a picture placeholder and movie title). By presenting the index table content with an image and title, the amount of data employed to present a graphical element for a content title is relatively small, such that downloading and navigation of the graphical user interface can be presented in a quick and efficient manner.

Process 700 may be initiated by analyzing user commands (e.g., user behavior) at block 705. At block 710, user operations, such as navigation commands, are detected and recorded. The duration and time interval between commands is determined at block 715.

At block 720, the amount of items to ignore, such as a percentage, and navigation speed for advancing a graphical user interface, may be determined based on the analysis of user commands at block 705. By way of example, user commands or behavior may be determined according to the length of time a user holds an input key or command, such as the down, left or right direction commands, to determine the number of data items or content titles required to be ignored. In one embodiment, the longer a user activates a key, the amount of content to be ignored will increase. Table 1 illustrates exemplary durations of a command and percentage of narrowing for the content.

TABLE 1

Users continuously press the up and down or left and right, ignores a proportion of content elements

| | |
|---|---|
| <1 s | Operating time <1 s, the algorithm does not start |
| 1 s~1.5 s | 2% |
| 1.5 s~3 s | 4% |
| >3 s | 5% |

According to an exemplary embodiment, and as shown in TABLE 1, continuously pressing or activating a key or button of a control (e.g., directional button, smart key, etc.) can update presentation of a graphical user interface. In certain embodiments, every half second (e.g., 0.5 second) that a key or button is held can reduce content displayed or presented by a percentage. Table 1 provides exemplary values. In one embodiment, holding a key or button for a period of time for under 1 second will not reduce the content. Holding the a key or button for a period of time within 1 to 1.5 seconds will reduce the content by 2%, holding the key or button for a period of time within 1.5 to 3 seconds will reduce the content by 4% and holding the key or button for a period of time greater than 3 seconds will reduce the content by 3%. It should be appreciated that the values in Table 1 are exemplary and that other values may be employed. In this fashion, an input command held for three seconds may allow for advancing focus through content at an accelerated rate.

According to another exemplary embodiment, analysis of user commands at block 705 and determining the amount of items to ignore at block 720 includes determining whether a key (e.g., graphical user interface input command, etc.) has been held for one or more predetermined time periods. For example, when a key is held within or below a first period of time, a controller will determine that content items are not to be ignored at block 720 for presentation of the graphical user interface. When a key is held for a second period of time, a controller will determine a first percentage of content items to be ignored at block 720 for presentation of the graphical user interface. In one embodiment, the second period of time corresponds to a longer duration of time than the first period of time. For example, the second period of time may be 2 seconds or more longer than the first period of time. In another embodiment, the first period of time precedes the second period of time, wherein the second period of time follows the first period of time.

According to another embodiment, between the first period of time and the second period of time, one or more percentages for ignoring or reducing content titles for presentation of the graphical user interface may be determined at block 720, the one or more percentages based on different lengths that a key is held. In one embodiment, the percentage for ignoring or reducing content titles for presentation of the graphical user interface determined at block 720 for a time interval after the first period of time and before the second period of time may be increased by fixed percentage values (e.g., 2%, 4%, 6%, etc.), each percentage value corresponding to a length of time the key is held. In another embodiment, the percentage for ignoring or reducing content titles for presentation of the graphical user interface determined at block 720 for a time interval after the first period of time and before the second period of time may be increased by non-uniform fixed percentage values (e.g., 2%, 3%, 5%, etc.), each percentage value corresponding to a length of time the key is held. In that fashion, a first percentage (e.g., 2%) of content titles to be ignored, may be changed to a second percentage of content titles (e.g., 3%) that is incremented less than the first percentage of content titles, and then the percentage may be increased to a third percentage (e.g., 5%) of content titles as the duration a key is held increases within the second period of time. The percentage of content titles to ignore or reduce may be increased following the second period of time. In one exemplary embodiment, the second percentage of content titles (e.g., 3%) may be increased after the second period of time to another percentage (e.g., 5%, 10%, 20%, etc.) for ignoring or reducing content titles for presentation of the graphical user interface.

At block 725, navigation focus applied to the content may be adjusted at an advanced rate, or fast focus, that is faster than adjustment of one element at a time. By way of example, the focus may be advanced at multiples of β2×, 5×, 10×, etc. The rate of fast focus may be directly related to the number of times an interface command is received.

Process 700 includes detecting user release at block 730 and fixing the position focus at block 735 to content associated with the user release. When the user releases the command input to quickly locate a content title, the graphical user interface can send a request to a content server to download the content title.

Figure 8:
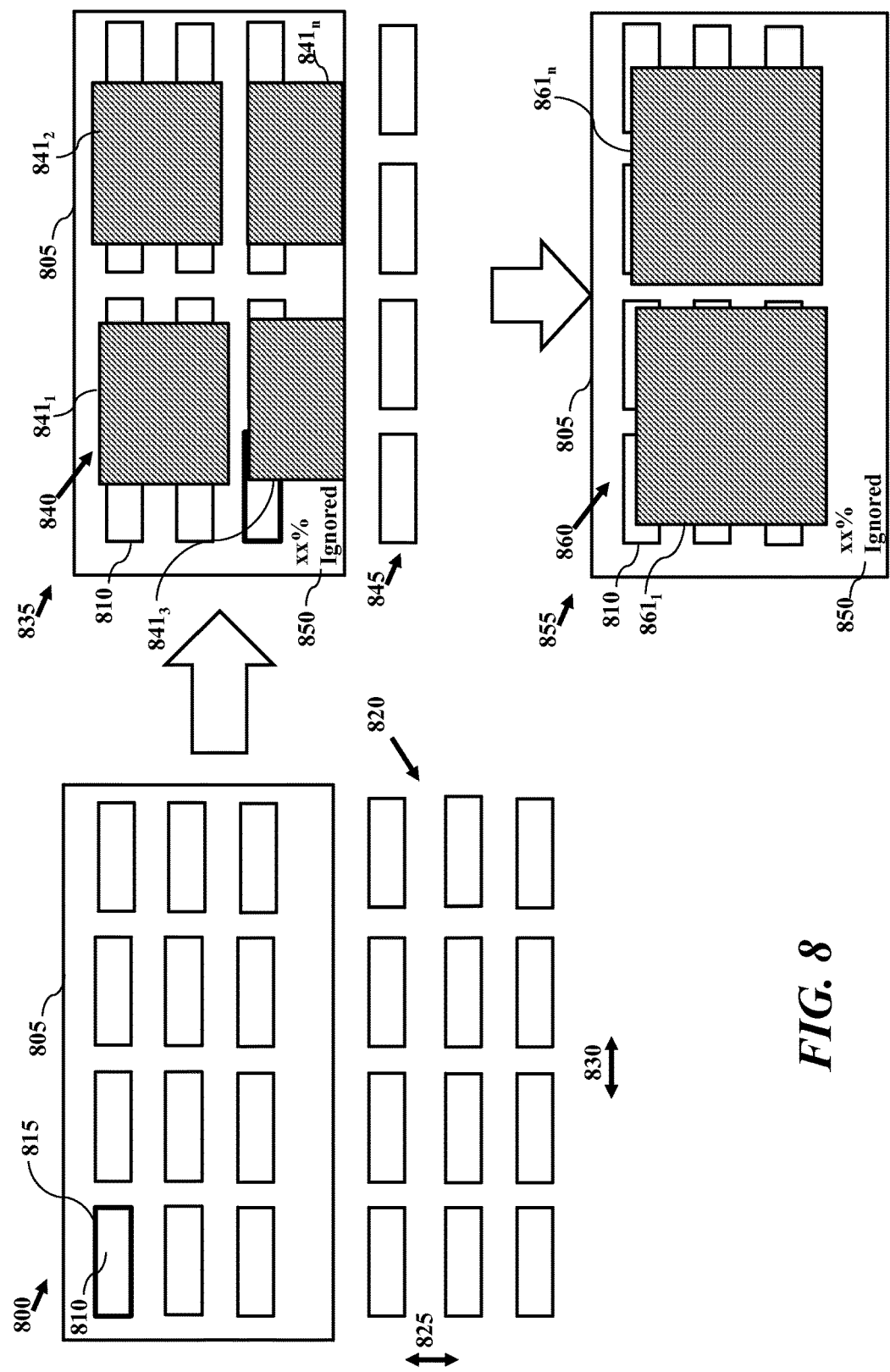
FIG. 8 depicts a graphical representation of graphical user interface presentation according to one or more embodiments.

FIG. 8 depicts a graphical representation of user interface presentation according to one or more embodiments. According to one embodiment, the graphical user interface may modify attributes of displayed graphical elements during navigation of content, such as, scrolling or browsing content files.

In one embodiment, graphical user interface 800 may be output to display window 805 of a device. Graphical user interface 800 relates to a configuration for presenting content including, graphical elements shown as 810, to represent content. By way of example, display window 805 may be presented by a display device presenting content, such as movie titles, wherein each graphical element 810, represents a particular content title, such as a movie title. Graphical user interface 800 can also provide a focus element 815 to allow for navigation of the user interface and selection of content.

According to one embodiment, graphical user interface 800 includes graphical elements shown as 810 in display window 805 and allows for display of additional graphical elements, shown as 820, that may be accessible to the device. Graphical user interface 800 is configured to allow a user to navigate to graphical elements 820, such that the elements presented in display window 805 may be modified.

In one embodiment, graphical user interface 800 includes graphical elements 810 based on a selection of an index table.

Focus element 815 may be moved to highlight or select content, in one or more directions, including vertically, shown by 825 and horizontally, shown by 830. Based on a user command, focus element 815 may be applied to one or more other graphical elements and the presentation and graphical elements of graphical user interface 800 may be modified. In that fashion, a user may browse and navigate to content within the display window 805 and content outside of the display window 805.

FIG. 8 additionally depicts updating of the graphical user interface 800 according to one or more embodiments. Based on interface commands detected by a device for navigating the graphical user interface 800 and the content titles associated with the index table, graphical user interface 800 may be modified. By way of example, certain interface commands may indicate a desire of the user to view a reduced set or narrowed set of content based on the interface command. As an example, a user selection of a directional key on a remote control, or navigation button on graphical user interface 800, may update the presentation of graphical user interface 800 to present graphical user interface 835.

Graphical user interface 835 includes a reduced set of content titles, such as first content set 840, in comparison to graphical user interface 800. In one embodiment, first content set 840 includes graphical elements $841_{1-n}$ corresponding to content titles. In addition, graphical elements $841_{1-n}$ of first content set 840 are shown with increased size. Graphical user interface 835 is configured to allow a user to navigate to graphical elements 845, such that the elements presented in display window 805 may be modified. Graphical user interface 835 may optionally include a message 850 indicating the amount or percentage of content ignored. By way of example, a user command relating to a down direction key, held down or activated, may successively reduce the percentage of content to be viewed, in which case, message 855 may be updated by graphical user interface 835 so that a user can determine when to release the user command.

Graphical user interface 855 relates to a successive update of graphical user interface 835 such that a second content set 860 including graphical elements $861_{1-n}$ are presented in display window 805, the graphical elements $861_{1-n}$ may be presented with increased size relative to a previous presentation of the graphical user interface. In one embodiment, graphical elements $861_{1-n}$ correspond to content titles. Accordingly, the presentation size of graphical elements $841_{1-n}$ of first content set 840 and graphical elements $861_{1-n}$ of second content set 860, within the graphical user interface, includes increased presentation sizes for content titles relative to the presentation size of content titles, such as graphical element 810 in graphical user interface 800. In one embodiment, first content set 840 and second content set 860 may be presented dynamically in response to user commands to allow for scrolling and/or presentation of content titles.

According to one embodiment, the area (e.g., amount of display area for presentation of content titles) and/or display window in the graphical user interface for first content set 840 and second content set 860 are the same. As such, the area for presentation of the first content set 840 and second content set 860 is fixed and does not increase. In one embodiment, after release of the user command, graphical elements $861_{1-n}$ of second content set 860 will remain displayed. In other embodiments, the graphical user interface may display content titles without the increased size of first content set 840 and second content set 860. For example graphical elements $861_{1-n}$ may be reduced to the size of graphical element 810 following release of a user command and/or selection of a graphical element associated with a content title. According to one embodiment, graphical elements $841_{1-n}$ and $861_{1-n}$ can be superimposed over graphical elements, such as graphical element 810, such as on a top layer of the graphical use interface. In other embodiments, graphical elements $841_{1-n}$ and $861_{1-n}$ can be presented without presentation of graphical element 810.

While this disclosure has been particularly shown and described with references to exemplary embodiments thereof, it will be understood by those skilled in the art that various changes in form and details may be made therein without departing from the scope of the claimed embodiments.

What is claimed is:

1. A method for presenting a graphical user interface for navigating content, the method comprising:
   detecting, by a device, one or more interface commands for navigating the graphical user interface and one or more content titles associated with an index table;
   analyzing, by the device, the one or more interface commands for navigating the graphical user interface and the one or more content titles associated with the index table, wherein analyzing includes determining duration of the one or more interface commands;
   determining, by the device, an amount of items of the graphical user interface associated with the index table to ignore in response to the duration of the one or more interface commands determined; and
   updating, by the device, presentation of the graphical user interface based on the analyzing, wherein the graphical user interface is updated to display graphical elements based on a subset of the content titles associated with the index table and wherein navigation of the user interface is modified to provide increased navigational speed for the graphical user interface, wherein content titles of the graphical user interface are reduced by a determined amount of items to ignore.

2. A method for presenting a graphical user interface for navigating content, the method comprising:
   receiving, by a device, a selection of an element of the graphical user interface, wherein the selection is associated with an index table and wherein the index table is associated with one or more content titles;
   updating presentation of a graphical user interface, by the device, based on the selection, wherein the user interface is updated to display graphical elements for a plurality of content titles associated with the index table;
   detecting, by the device, one or more interface commands for navigating the graphical user interface and the content titles associated with the index table;
   analyzing, by the device, the one or more interface commands for navigating the graphical user interface and the content titles associated with the index table, wherein analyzing includes determining duration of the one or more interface commands;
   determining, by the device, an amount of items of the graphical user interface associated with the index table to ignore in response to the duration of the one or more interface commands determined; and controlling, by the device, presentation of the graphical user interface based on the analyzing, wherein the graphical user interface is updated to display graphical elements based on a subset of the content titles associated with the index table and wherein navigation of the user interface is modified to provide increased navigational speed for the graphical user interface, wherein content titles of the graphical user interface are reduced by a determined amount of items to ignore.

3. The method of claim 2, wherein each index table identifies content based on one or more parameters and wherein each index table identifies a subset of content accessible from a content server.

4. The method of claim 2, wherein the content titles are one or more types of content associated with video data, applications and media content.

5. The method of claim 2, wherein the graphical user interface is a graphical display to provide graphical elements for selection of content and for at least one of display and output by the device.

6. The method of claim 2, wherein the user interface commands include at least one of directional, selection, advancement, and scrolling commands.

7. The method of claim 2, wherein the analyzing includes identifying at least one of duration and quantity of commands received by the device during an interval of time to determine the amount of items to ignore and navigation speed for advancing the graphical user interface.

8. The method of claim 2, wherein the analyzing includes detecting activation and release of a command input.

9. The method of claim 2, wherein the updating includes narrowing content associated with the index table to be presented by the user interface by fixed percentage values, each percentage value corresponding to a length of time an input command is held.

10. The method of claim 2, wherein the controlling includes changing the presentation of content by the user interface including at least one of enlarging presentation of content and increasing focus for content titles.

11. The method of claim 2, wherein content presentation is advanced at one or more increasing rates based on the analyzing of one or more interface commands.

12. A device configured to present a graphical user interface for navigating and browsing content, the device comprising:
a communications unit configured to receive a selection of an element of the graphical user interface, wherein the selection is associated with an index table and wherein the index table is associated with one or more content titles; and
a controller coupled to the communications unit, wherein the controller is configured to
update presentation of a graphical user interface based on the selection, wherein the user interface is updated to display graphical elements for a plurality of content titles associated with the index table;
detect one or more interface commands for navigating the graphical user interface and the content titles associated with the index table;
analyze the one or more interface commands for navigating the graphical user interface and the content titles associated with the index table, wherein analyzing includes determining duration of the one or more interface commands;
determining, by the device, an amount of items of the graphical user interface associated with the index table to ignore in response to the duration of the one or more interface commands determined; and
control presentation of the graphical user interface based on the analyzing, wherein the graphical user interface is updated to display graphical elements based on a subset of the content titles associated with the index table and wherein navigation of the user interface is modified to provide increased navigational speed for the user interface, wherein content titles of the graphical user interface are reduced by a determined amount of items to ignore.

13. The device of claim 12, wherein each index table identifies content based on one or more parameters and wherein each index table identifies a subset of content accessible from a content server.

14. The device of claim 12, wherein the content titles are one or more types of content associated with video data, applications and media content.

15. The device of claim 12, wherein the graphical user interface is a graphical display to provide graphical elements for selection of content and for at least one of display and output by the device.

16. The device of claim 12, wherein the user interface commands include at least one of directional, selection, advancement, and scrolling commands.

17. The device of claim 12, wherein analyzing by the controller includes identifying at least one of duration and quantity of commands received by the device during an interval of time to determine the amount of items to ignore and navigation speed for advancing the graphical user interface.

18. The device of claim 12, wherein analyzing by the controller includes detecting activation and release of a command input.

19. The device of claim 12, wherein updating by the controller includes narrowing content associated with the index table to be presented by the user interface by fixed percentage values, each percentage value corresponding to a length of time an input command is held.

20. The device of claim 12, wherein the controller controls presentation of the graphical user interface based on analyzing including changing the presentation of content by the user interface including at least one of enlarging presentation of content and increasing focus for content titles.

21. The device of claim 12, wherein content presentation is advanced at one or more increasing rates based on the analyzing of one or more interface commands.

* * * * *